(12) United States Patent
Inose et al.

(10) Patent No.: US 12,384,479 B2
(45) Date of Patent: Aug. 12, 2025

(54) VEHICLE

(71) Applicant: HONDA MOTOR CO., LTD., Tokyo (JP)

(72) Inventors: Koji Inose, Tokyo (JP); Ryohei Kitamura, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 83 days.

(21) Appl. No.: 18/552,207

(22) PCT Filed: Feb. 18, 2022

(86) PCT No.: PCT/JP2022/006616
§ 371 (c)(1),
(2) Date: Sep. 25, 2023

(87) PCT Pub. No.: WO2022/209407
PCT Pub. Date: Oct. 6, 2022

(65) Prior Publication Data
US 2024/0166284 A1 May 23, 2024

(30) Foreign Application Priority Data
Mar. 31, 2021 (JP) ................................ 2021-059695

(51) Int. Cl.
*B62H 5/02* (2006.01)
*B62J 45/00* (2020.01)

(52) U.S. Cl.
CPC ................ *B62H 5/02* (2013.01); *B62J 45/00* (2020.02)

(58) Field of Classification Search
CPC .................................. B62H 5/02; B62J 45/00
See application file for complete search history.

(56) References Cited

U.S. PATENT DOCUMENTS 5,343,077 A    8/1994   Yoshida et al.
9,284,006 B2 *   3/2016   Tamura ...................... B62J 9/27
(Continued)

FOREIGN PATENT DOCUMENTS

BR     PI 0 904 254 A2    7/2010
JP         3025198 B2    3/2000
(Continued)

OTHER PUBLICATIONS

Extended European Search Report dated Jul. 17, 2024 issued in corresponding European application No. 22 77 9634; 6 pages).
(Continued)

*Primary Examiner* — Mohamed Barakat
(74) *Attorney, Agent, or Firm* — Rankin, Hill & Clark LLP

(57) ABSTRACT

A vehicle that can secure both stable communication by an ECU including a communication unit that unlocks a handle-bar lock module and theft prevention. The vehicle includes a steering shaft, a vehicle body frame including a head pipe that turnably supports the steering shaft and a seat rail that is disposed below a seat on which a rider is seated to fix the seat, and a communication unit for communicating with a smart key (a device external to the vehicle). The communication unit is provided below and on the outer side in a vehicle width direction of the seat rail and in a space covered by and on the inner side of a side cover (vehicle body cover) that protects a vehicle body part.

5 Claims, 7 Drawing Sheets

(56) References Cited

U.S. PATENT DOCUMENTS

| | | | |
|---|---|---|---|
| 10,960,947 B2* | 3/2021 | Nishimura | B62K 21/12 |
| 2005/0103069 A1* | 5/2005 | Konno | B62H 5/20 |
| | | | 70/282 |
| 2006/0124379 A1* | 6/2006 | Ohira | F02M 35/0203 |
| | | | 180/292 |
| 2008/0236216 A1 | 10/2008 | Takeuchi et al. | |
| 2010/0078236 A1* | 4/2010 | Sasage | B62K 11/10 |
| | | | 180/65.51 |
| 2014/0197656 A1* | 7/2014 | Ochiai | H05K 5/069 |
| | | | 296/37.1 |
| 2020/0238819 A1* | 7/2020 | Tani | F01N 1/02 |

FOREIGN PATENT DOCUMENTS

| | | |
|---|---|---|
| JP | 2012-106658 A | 6/2012 |
| JP | 5123362 B2 | 1/2013 |
| JP | 2013-71675 A | 4/2013 |
| JP | 2014-148223 A | 8/2014 |
| JP | 5596012 B2 | 9/2014 |
| JP | 2020-100348 A | 7/2020 |
| JP | 2020-111189 A | 7/2020 |
| WO | 2020/202343 A1 | 10/2020 |

OTHER PUBLICATIONS

English translation of the International Preliminary Report on Patentability issued Oct. 3, 2023 in the corresponding International application No. PCT/JP2022/006616 (5 pages).

International Search Report dated Apr. 5, 2022, Application No. PCT/JP2022/006616; 4 pages.

Written Opinion of the International Searching Authority dated Apr. 4, 2022, Application No. PCT/JP2022/006616; 3 pages.

Japanese Office Action Corresponding to Application No. JP 2023-510642 A, dated Mar. 12, 2024, with English Translation, 9 pages.

European Office Action dated Apr. 9, 2025 issued in corresponding European application No. 22 779 634.9; 38 pages.

* cited by examiner

VEHICLE

TECHNICAL FIELD

The present invention relates to a vehicle.

BACKGROUND ART

Conventionally, for example, a technique has been disclosed in which an ECU including a vehicle unlocking unit and a communication unit are integrally provided as a control unit in a vehicle (see, for example, Patent Literature 1).

For example, a technique in which a control unit is provided under a rider's seat is disclosed (see, for example, Patent Literature 2).

CITATION LIST

Patent Literature

Patent Literature 1: WO 2020/202343 A
Patent Literature 2: JP 2020-111189 A

SUMMARY OF INVENTION

Technical Problem

A conventional technique of providing in a vehicle an ECU including a vehicle unlocking unit for unlocking a handlebar lock module is disclosed. In providing an ECU including a communication unit for unlocking a handlebar lock module in a vehicle, it is required to secure stable communication by a communication unit and theft prevention.

The present invention has been made in view of the above point. An object of the present invention is to provide a vehicle that secures both stable communication by an ECU including a communication unit that unlocks a handlebar lock module and theft prevention.

Solution to Problem

To achieve the above object, in the present invention, a vehicle including a steering shaft, a vehicle body frame including a head pipe that turnably supports the steering shaft, a main frame that extends from the head pipe to a rear side of the vehicle, and a seat rail that is continuous with the main frame and disposed below a seat on which a rider of the vehicle is seated to fix the seat, and a drive device that generates power for the vehicle, includes a communication unit for communicating with a device external to the vehicle, where the communication unit is provided below and on an outer side in a vehicle width direction of the seat rail and in a space covered by and on an inner side of a vehicle body cover that protects a vehicle body part.

This specification includes all the contents of Japanese Patent Application No. 2021-059695 filed on Mar. 31, 2021.

Advantageous Effects of Invention

According to the present invention, since a communication unit is provided below and on the outer side in the vehicle width direction of the seat rail and in a space covered by and on the inner side of a vehicle body cover that protects vehicle body parts, metal parts do not hinder communication by the communication unit, and stability of communication can be improved. Moreover, providing the communication unit in the space covered by and in the inner side of the vehicle body cover that protects vehicle body parts makes it difficult to remove the communication unit from the vehicle, which secures theft prevention.

DESCRIPTION OF EMBODIMENTS

Embodiments of the present invention will be described below with reference to the drawings. Note that, in the description, directions such as front, rear, left, right, up, and down are respectively the same as the directions with respect to a vehicle body unless otherwise specified. In each of the drawings, a reference sign FR denotes the front side of the vehicle body, a reference sign UP denotes the upper side of the vehicle body, and a reference sign LH denotes the left side of the vehicle body.

EMBODIMENTS

Figure 1:
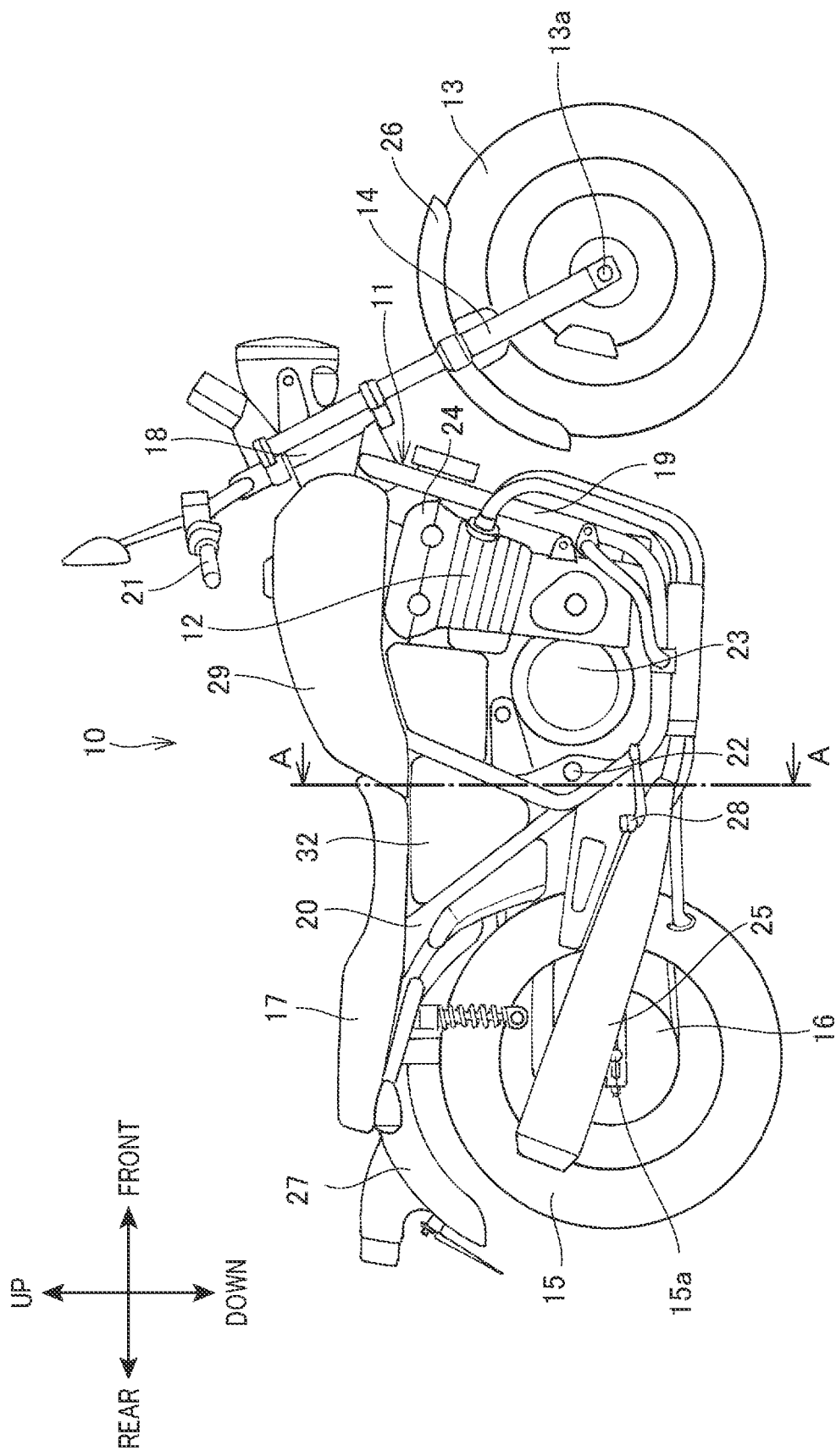
FIG. 1 is a perspective view illustrating a configuration of a vehicle according to a present embodiment.

FIG. 1 is a side view illustrating a saddle-ride vehicle 10 according to an embodiment of the present invention.

The saddle-ride vehicle 10 is a vehicle including a vehicle body frame 11, a power unit 12 supported by the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider is seated astride the seat 17. The seat 17 is provided in the upper side of a rear part of the vehicle body frame 11.

The vehicle body frame 11 includes a head pipe 18 provided at a front end portion of the vehicle body frame 11, a front frame 19 located rearward of the head pipe 18, and a rear frame 20 located rearward of the front frame 19. A front end portion of the front frame 19 is connected to the head pipe 18.

The seat 17 is supported by the rear frame 20.

The front fork 14 is supported by the head pipe 18 so as to be steerable to the left and the right. The front wheel 13 is supported by an axle 13a, which is provided at a lower end portion of the front fork 14. A steering handlebar 21 to be gripped by the rider is attached to an upper end portion of the front fork 14.

The swing arm 16 is supported by a pivot shaft 22 supported by the vehicle body frame 11. The pivot shaft 22 is a shaft extending horizontally in the vehicle width direction. The pivot shaft 22 is inserted through a front end portion of the swing arm 16. The swing arm 16 swings up and down about the pivot shaft 22.

The rear wheel 15 is supported by an axle 15a, which is provided at a rear end portion of the swing arm 16.

The power unit 12 is disposed between the front wheel 13 and the rear wheel 15, and is supported by the vehicle body frame 11.

The power unit 12 is an internal combustion engine. The power unit 12 includes a crankcase 23, and a cylinder portion 24 that houses a reciprocating piston. The cylinder portion 24 has an exhaust port to which an exhaust device 25 is connected.

Output of the power unit 12 is transmitted to the rear wheel 15 by a drive force transmission member that connects the power unit 12 and the rear wheel 15.

In addition, the saddle-ride vehicle 10 includes a front fender 26 that covers the front wheel 13 from the upper side, a rear fender 27 that covers the rear wheel 15 from the upper side, a step 28 on which the rider places his or her foot, and a fuel tank 29 for storing fuel to be used by the power unit 12.

The front fender 26 is attached to the front fork 14. The rear fender 27 and the step 28 are provided below the seat 17. The fuel tank 29 is supported by the vehicle body frame 11.

Figure 2:
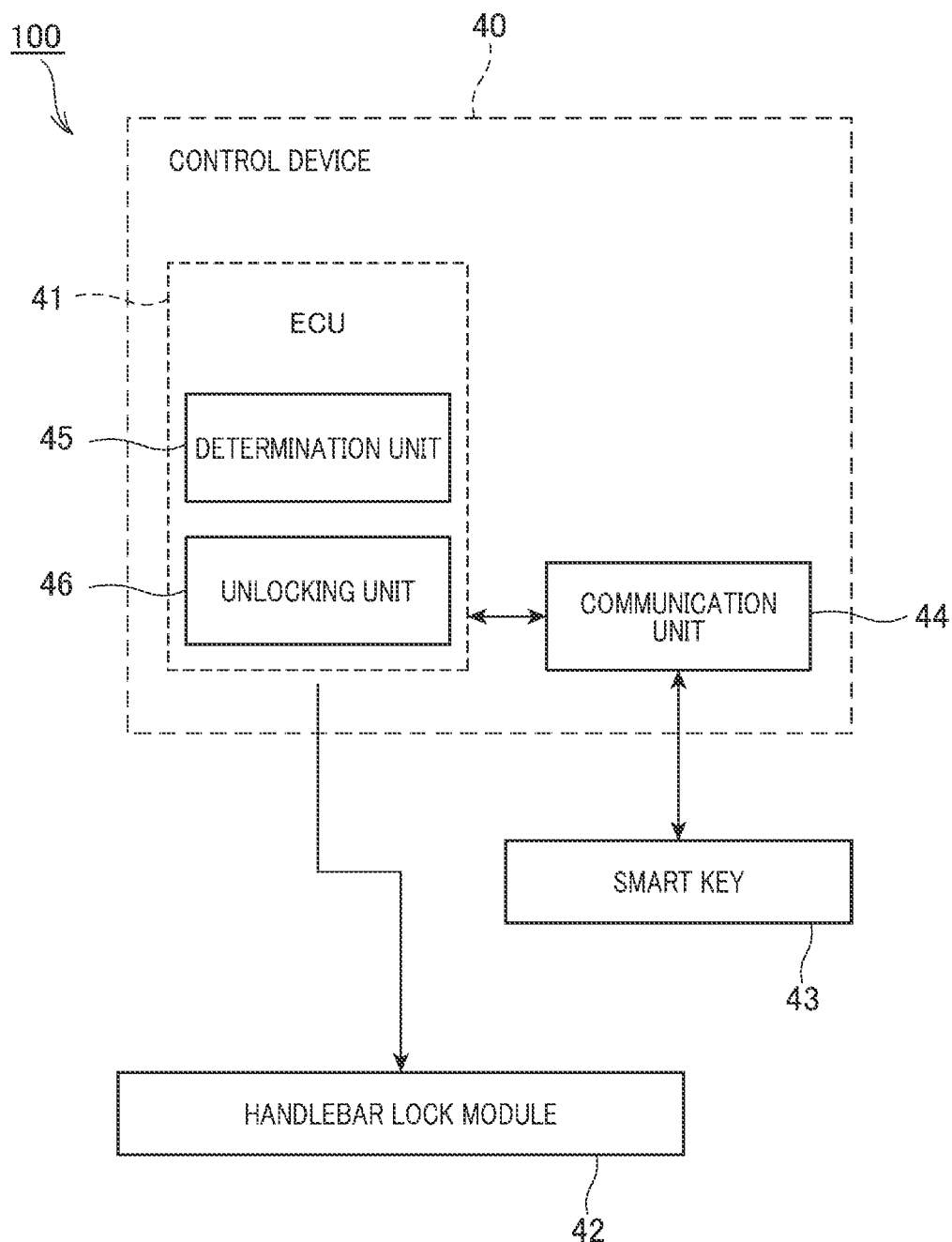
FIG. 2 is a block diagram illustrating a configuration of a control device according to the present embodiment.

FIG. 2 is a block diagram illustrating a configuration of a control device.

As illustrated in FIG. 2, a control device 40 includes an ECU 41 as a control unit. The ECU 41 includes, for example, a processor such as a central processing unit (CPU) and a storage unit such as a random access memory (RAM) and a read only memory (ROM).

The storage unit stores data such as an engine control program. Specifically, a processor of the ECU 41 executes a control program to control components of the vehicle.

The ECU 41 is connected to a handlebar lock module 42. The handlebar lock module 42 is for locking the turning action of the handlebar during parking.

The control device 40 includes a communication unit 44 that receives a signal from a smart key 43 as a device external to the vehicle and carried by the rider.

The control device 40 includes a determination unit 45 that determines whether a signal from the smart key 43 received by the communication unit 44 is a signal for unlocking the handlebar lock module 42, and an unlocking unit 46 that unlocks the handlebar lock module 42 when determination is made that the signal from the smart key 43 is a signal for unlocking.

By the rider operating the smart key 43, a signal is transmitted from the smart key 43 to the ECU 41 via the communication unit 44 and the determination unit 45 of the ECU 41 determines whether the signal from the smart key 43 is a signal for unlocking. When the determination unit 45 determines that the signal is for unlocking, the unlocking unit 46 unlocks the handlebar lock module 42.

Figure 3:
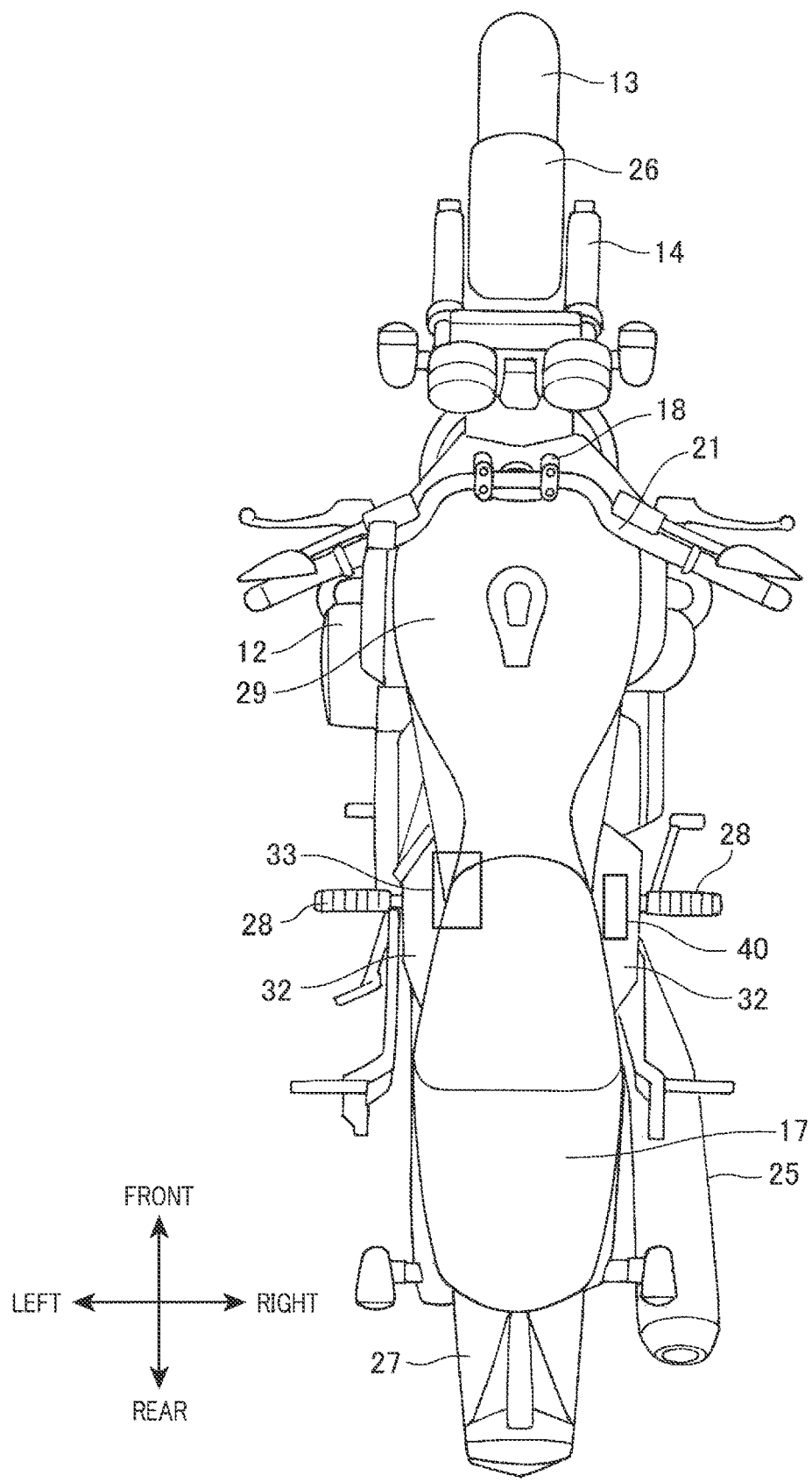
FIG. 3 is a plan view of a vehicle body according to the present embodiment.
Figure 4:
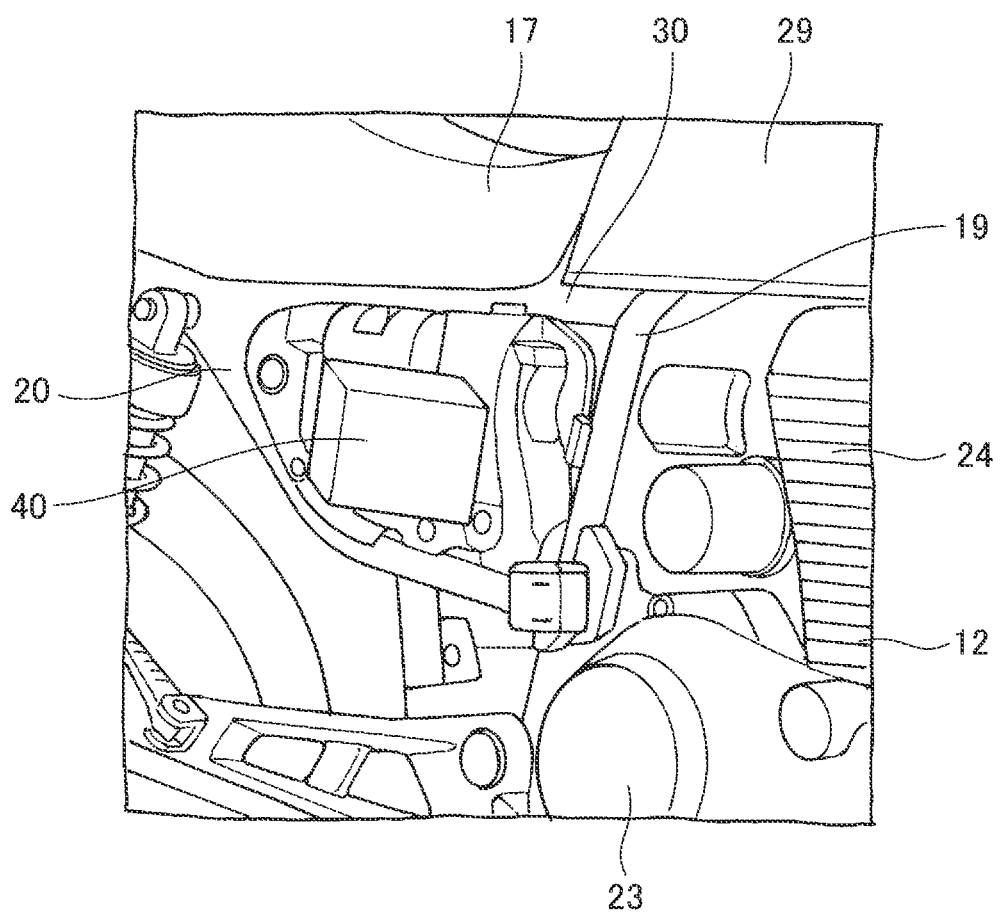
FIG. 4 is a perspective view of the vehicle body according to the present embodiment as viewed from a right side.
Figure 5:
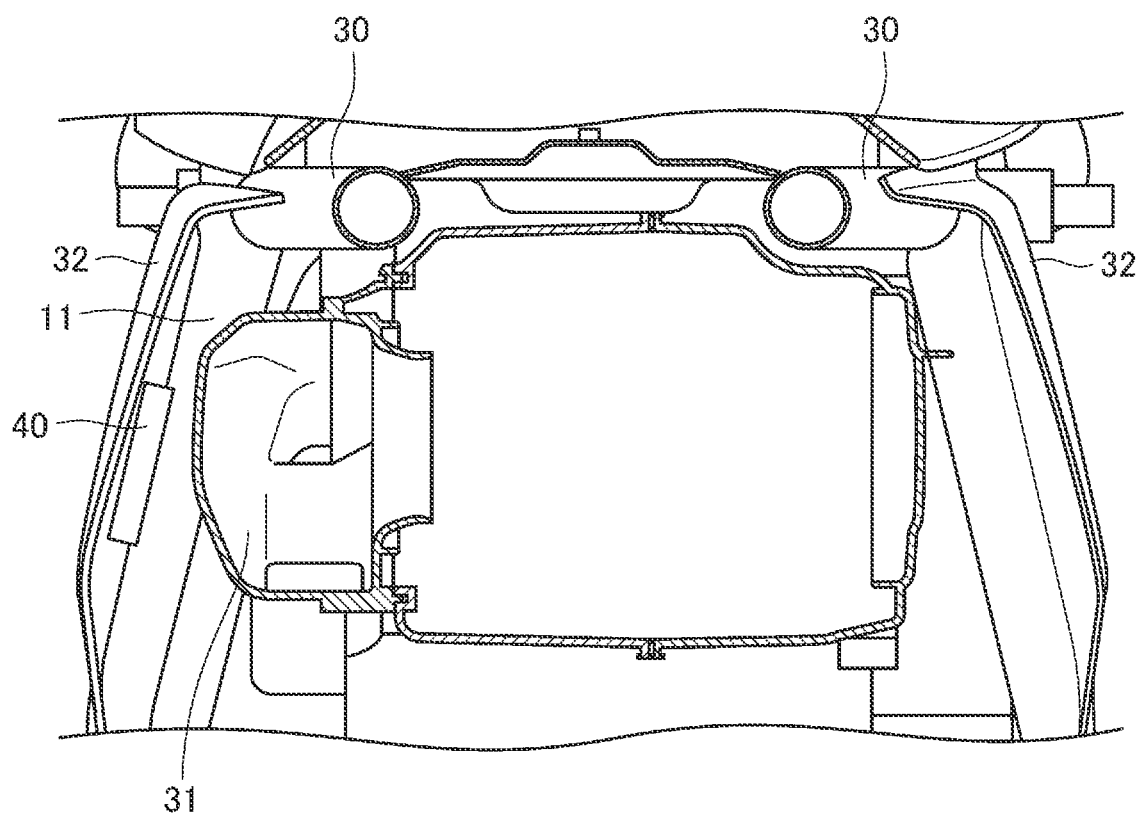
FIG. 5 is a cross-sectional view taken along line A-A in FIG. 1.

FIG. 3 is a plan view of the vehicle body. FIG. 4 is a perspective view of the vehicle body as viewed from the right side. FIG. 5 is a cross-sectional view taken along line A-A in FIG. 1.

As illustrated in FIGS. 3 and 4, the rear frame 20 includes a seat rail 30 that supports the seat 17. Vehicle body parts such as an air cleaner 31 is housed in a space in the upper side of the rear frame 20 and below the seat rail 30. A side cover 32 as a vehicle body cover is attached on the outer side of the space demarcated by the seat rail 30 and the rear frame 20.

As illustrated in FIGS. 1 and 2, an exhaust device 25 as an exhaust mechanism extending rearward and connected to the exhaust port of the power unit 12 is attached on the right side of the vehicle body frame 11.

A battery 33 as an electric storage device is installed on a side opposite to the right side on which the exhaust device 25 of the vehicle is attached.

In the present embodiment, the control device 40 is installed on a side where the exhaust device 25 is provided and in a space demarcated by the seat rail 30 and the rear frame 20. In this state, the control device 40 is disposed further on the outer side than the seat rail 30 in the vehicle width direction and in the inner side of the side cover 32.

With the side cover 32 positioned not to overlap a leg of the rider riding the vehicle in a side view, communication by the communication unit 44 of the control device 40 is not hindered by the rider when the control device 40 is disposed in the inner side of the side cover 32.

When the control device 40 is disposed on the inner side of the seat rail 30, the seat rail 30 made of metal may cause a communication failure. However, in the present embodiment, since the control device 40 is disposed on the outer side of the seat rail 30 and on the side where the exhaust device 25 is installed, that is, on the side opposite to the side where the battery 33 is installed, effects by the seat rail 30 made of metal causing communication failure and the battery 33 can be suppressed, and stable communication by the communication unit 44 of the control device 40 can be secured.

Note that, only the communication unit 44 may be disposed at the place where the control device 40 is disposed. By disposing the communication unit 44 in such a manner, there will be no chance of the communication unit 44 suffering communication failure caused by a metal part such as the seat rail 30.

In addition, providing the control device 40 on the side opposite to the side where there are many metal parts and where the battery 33 is provided in an easily detachable manner can improve stability of communication, and improve theft prevention without using additional parts.

The control device 40 is fixed to the vehicle body frame 11. By fixing the control device 40 to the vehicle body frame 11 having high rigidity, assembling work can be performed stably, and work efficiency can be improved.

Next, an effect of the present embodiment will be described.

In the present embodiment, to unlock the handlebar lock module 42, the rider operates the smart key 43 to transmit a signal from the smart key 43 to the ECU 41 via the communication unit 44. The determination unit 45 of the ECU 41 determines whether the signal from the smart key 43 is a signal for unlocking, and when the determination unit 45 determines that the signal is for unlocking, the unlocking unit 46 unlocks the handlebar lock module 42.

The handlebar lock module 42 is thereby unlocked, and now the handlebar can be turned.

In the present embodiment, the control device 40 is disposed in the space demarcated by the seat rail 30 and the rear frame 20 to be on the outer side of the seat rail 30 and on the inner side of the side cover 32, so that communication by the communication unit 44 of the control device 40 is not hindered by a metal part, and stability of communication can be improved.

Moreover, providing the control device 40 in the space covered by and in the inner side of the side cover 32 that protects vehicle body parts makes it difficult to remove the control device 40 from the vehicle, and thus secures theft prevention. Furthermore, with the control device 40 provided on the side where the exhaust device 25 is installed, in case of accidental falling, the exhaust device 25 first hits to mitigate an impact on the control device 40. This improves impact resistance of the control device 40 against accidental falling without improving durability of the control device 40.

In addition, fixing the control device 40 to the vehicle body frame 11 firmly fixes the control device 40 to improve impact resistance.

As described above, the present embodiment includes the communication unit 44 for communicating with the smart key 43 (device external to the vehicle), and the communication unit 44 is provided in the space below and on the outer side in the vehicle width direction of the seat rail 30, and is covered by and on the inner side of the side cover 32 (vehicle body cover) that protects the vehicle body parts.

Since the communication unit 44 is provided on a side, in the vehicle width direction, where the exhaust device 25 is provided, below and on the outer side in the vehicle width direction of the seat rail 30, and in a space covered by and on the inner side of the side cover 32 that protects the vehicle body parts, communication made by the communication unit 44 is not hindered by a metal part, and stable communication can be improved. Moreover, providing the communication unit 44 in the space covered by and in the inner side of the side cover 32 that protects the vehicle body parts makes it difficult to remove the communication unit 44 from the vehicle, and this secures theft prevention.

In addition, the present embodiment includes the ECU 41 (control unit) that controls a device mounted on the vehicle, and the control device 40 including the communication unit 44 and the ECU 41.

The control device 40 including the communication unit 44 is provided below and on the outer side in the vehicle width direction of the seat rail and in the space covered by and on the inner side of the side cover 32 that protects the vehicle body parts, so that stability of communication by the communication unit 44 can be improved. Moreover, providing the control device 40 in the space covered by and in the inner side of the side cover 32 that protects vehicle body parts makes it difficult to remove the control device 40 from the vehicle, and thus secures theft prevention.

Furthermore, in the present embodiment, the vehicle includes the handlebar lock module 42 that locks turning of the steering shaft, and the ECU 41 (control unit) determines whether to unlock the handlebar lock module.

According to this configuration, the control device 40 can unlock the handlebar lock module by the ECU 41 making determination to unlock the handlebar lock module.

The present embodiment includes the exhaust device 25 (exhaust mechanism) for exhausting substances produced in a process of operating the power unit 12 (drive device) to the outside of the vehicle, and the communication unit 44 is provided on a side, in the vehicle width direction, where the exhaust device 25 is provided With the communication unit 44 provided on the side where the exhaust device 25 is installed, in case of accidental falling, the exhaust device 25 first hits to mitigate an impact on the communication unit 44. This improves impact resistance of the communication unit 44 against falling without improving durability of the control device 40.

Furthermore, in the present embodiment, the communication unit 44 is attached to the vehicle body frame 11.

Fixing the communication unit 44 to the vehicle body frame 11 firmly fixes the communication unit 44 to improve impact resistance.

Furthermore, in the present embodiment, the vehicle includes the battery 33 (electric storage device) for operating at least one electrical component provided in the vehicle, and the battery 33 is provided on a side opposite to, in the vehicle width direction with respect to the vehicle center as an axis, the side where the communication unit 44 is provided.

Providing the communication unit 44 on the side opposite to the side where there are many metal parts and where the battery 33 is provided in an easily detachable manner can improve stability of communication and theft prevention without using additional parts.

Modification

Next, an exemplary modification of the present invention will be described.

Figure 6:
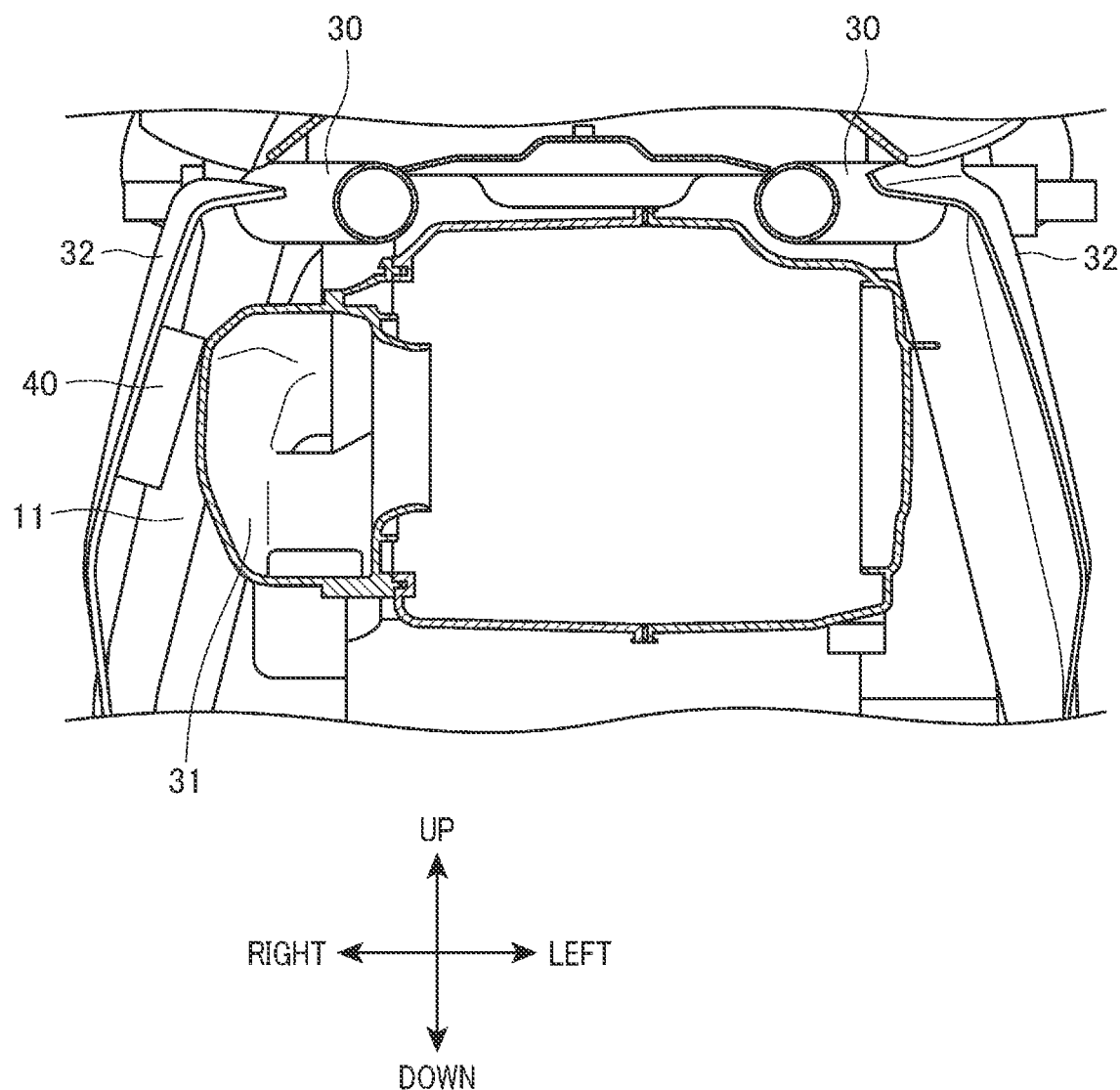
FIG. 6 is a cross-sectional view illustrating an exemplary modification of the present invention.

FIG. 6 is a cross-sectional view illustrating an exemplary modification of the present invention.

As illustrated in FIG. 6, in the present exemplary modification, a control device 40 including a communication unit 44 is attached to an inner surface of a side cover 32.

With the control device 40 including the communication unit 44 attached to the inner surface of the side cover 32, vibration of the vehicle body can be absorbed by the side cover 32. Thus, the control device 40 including the communication unit 44 can be installed in the vehicle without improving vibration resistance of the control device 40 including the communication unit 44.

Figure 7:
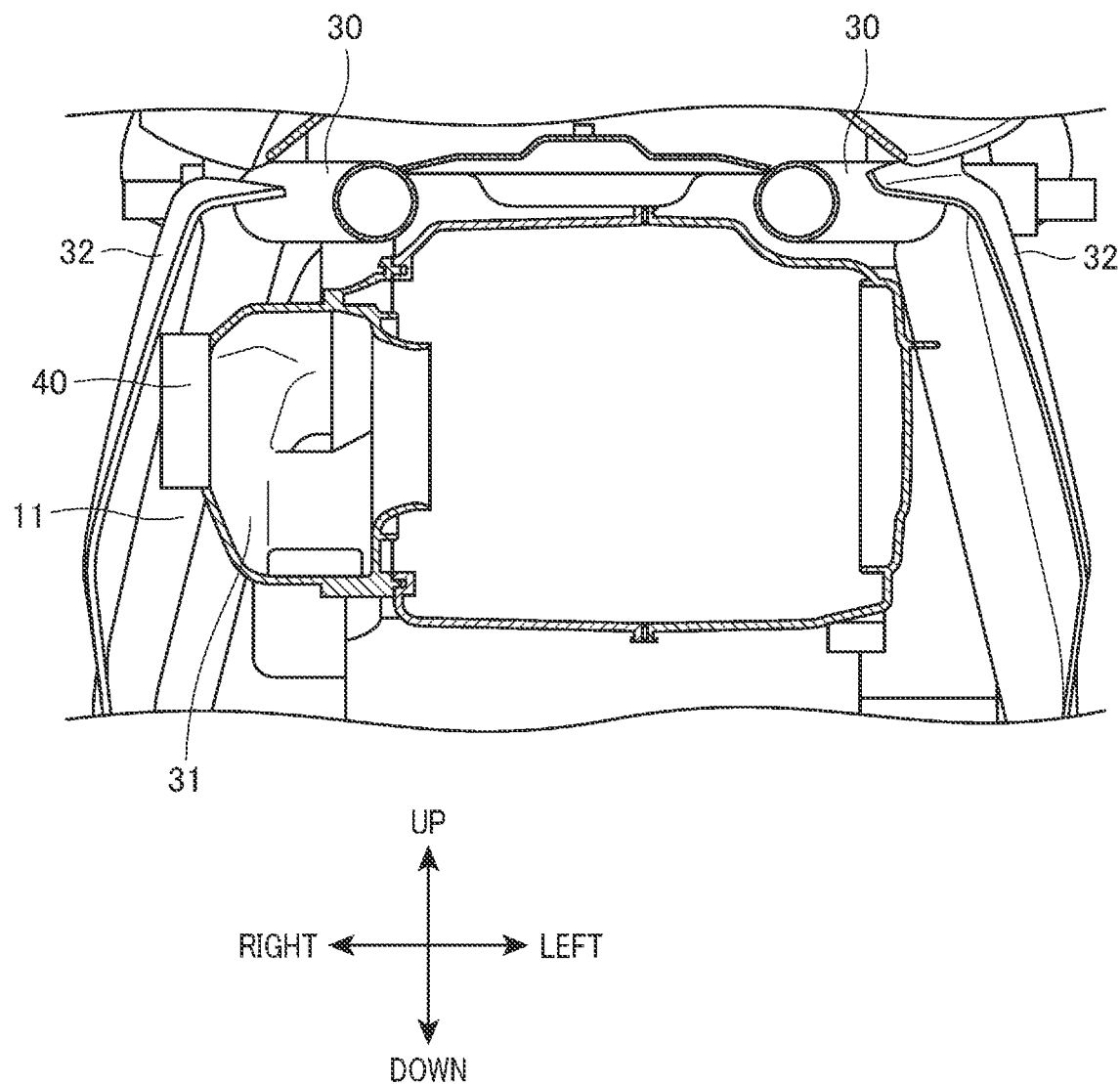
FIG. 7 is a cross-sectional view illustrating another exemplary modification of the present invention.

FIG. 7 is a cross-sectional view illustrating another exemplary modification of the present invention.

As illustrated in FIG. 7, an air cleaner 31 for removing impurities from air taken from outside the vehicle into the vehicle is provided below a seat rail 30.

In the present exemplary modification, a control device 40 including a communication unit 44 is attached to an outer side in the vehicle width direction of the air cleaner 31. The control device 40 including the communication unit 44 is attached to be disposed in the outer side in the vehicle width direction of the seat rail 30.

Since the air cleaner 31 is installed at a place where vibration of the vehicle body is small and is made of a non-metallic material such as resin, stable communication can be maintained without improving vibration resistance of the control device 40 including the communication unit 44 by attaching the control device 40 including the communication unit 44 to the air cleaner 31.

The present invention is not limited to the configuration of the above embodiment, and can be put into practice in various embodiments without departing from the gist of the invention.

For example, the vehicle according to the present invention is not limited to that uses an engine as the power unit 12, and can also be applied to a vehicle using an electric motor.

[Configurations Supported by Above Embodiment]

The above embodiment supports the following configurations.

(First configuration) A vehicle including a steering shaft, a vehicle body frame including a head pipe that turnably supports the steering shaft, a main frame that extends from the head pipe to a rear side of the vehicle, and a seat rail that is continuous with the main frame and disposed below a seat on which a rider of the vehicle is seated to fix the seat, and a drive device that generates power for the vehicle, the vehicle including a communication unit for communicating with a device external to the vehicle, where the communication unit is provided below and on an outer side in a vehicle width direction of the seat rail and in a space covered by and on an inner side of a vehicle body cover that protects a vehicle body part.

According to this configuration, since the communication unit is provided below and on the outer side in the vehicle width direction of the seat rail and in the space covered by and on the inner side of the vehicle body cover that protects the vehicle body parts, communication made by the communication unit is not hindered by the metal parts, so that stability of communication can be improved. Moreover, providing the communication unit in the space covered by and in the inner side of the vehicle body cover that protects the vehicle body parts makes it difficult to remove the communication unit from the vehicle, which secures theft prevention.

(Second configuration) The vehicle according to configuration 1, including a control unit that controls at least a device mounted on the vehicle, and a control device including the communication unit and the control unit.

According to this configuration, the control device including the communication unit is provided below and on the outer side in the vehicle width direction of the seat rail and in the space covered by and on the inner side of the vehicle body cover that protects the vehicle body parts, so that stability of communication by the communication unit can be improved. Moreover, providing the control device in the space covered by and in the inner side of the vehicle body cover that protects the vehicle body parts makes it difficult to remove the control device from the vehicle, which secures theft prevention.

(Third configuration) The vehicle according to the second configuration, including a handlebar lock module that locks turning of the steering shaft, where the control device makes determination to unlock the handlebar lock module.

According to this configuration, the control unit makes determination to unlock the handlebar lock module and the control device can unlock the handlebar lock module.

(Fourth configuration) The vehicle according to any one of the first to third configurations, including an exhaust mechanism for exhausting a substance produced in a process of operating the drive device to an outside of the vehicle, where the communication unit is provided on a side, in the vehicle width direction, where the exhaust mechanism is provided.

According to this configuration, the control device is provided on the side where the exhaust mechanism is installed, and in case of accidental falling, the exhaust mechanism first hits to mitigate an impact on the control device. This improves impact resistance of the control device against accidental falling without improving durability of the control device.

(Fifth configuration) The vehicle according to any one of the first to fourth configurations, where the communication unit is attached to the vehicle body frame.

According to this configuration, fixing the control device to the vehicle body frame firmly fixes the control device to improve impact resistance.

(Sixth configuration) The vehicle according to any one of the first to fourth configurations, where the communication unit is attached to the vehicle body cover.

According to this configuration, the control device including the communication unit is attached to the inner surface of the vehicle body cover, and vibration of the vehicle body can be absorbed by the vehicle body cover. Thus, the control device can be installed in the vehicle without improving vibration resistance of the control device.

(Seventh configuration) The vehicle according to any one of the first to fourth configurations, including an air cleaner that is provided below the seat and removes impurities from air taken from outside the vehicle into an inside of the vehicle, where the communication unit is attached to the air cleaner.

According to this configuration, since the control device is attached to the air cleaner installed at a place where vibration of the vehicle body is small and is made of a non-metallic material such as resin, stable communication can be maintained without improving vibration resistance of the control device itself.

(Eighth configuration) The vehicle according to any one of the first to seventh configurations, including an electric storage device for operating at least one electrical component provided in the vehicle, where the electric storage device is provided on a side opposite to, in the vehicle width direction with respect to the vehicle center as an axis, a side where the communication unit is provided.

According to this configuration, providing the control device on the side opposite to the side where there are many metal parts and where the electric storage device is provided in an easily detachable manner can improve stability of communication, and improve theft prevention without using additional parts.

REFERENCE SIGNS LIST 10 saddle-ride vehicle
11 vehicle body frame
12 power unit
17 seat
19 front frame
20 rear frame
21 handlebar
23 crankcase
24 cylinder portion
25 exhaust device
26 front fender
27 rear fender
28 step
29 fuel tank
30 seat rail
31 air cleaner
32 side cover
33 battery
40 control device
42 handlebar lock module
43 smart key
44 communication unit
45 determination unit
46 unlocking unit

The invention claimed is:
1. A vehicle, comprising:
a steering, shaft;
a vehicle body frame including a head pipe that turnably supports the steering shaft, a main frame that extends from the head pipe to a rear side of the vehicle, and a seat rail that is continuous with the main frame and disposed below a seat on which a rider of the vehicle is seated to fix the seat;
a drive device that is configured with an engine or an electric motor generating power for the vehicle;
a communicator that receives a signal from a device external to the vehicle and that transmits the signal to a processor controlling another device mounted on the vehicle; and an air cleaner that is for removing impurities from air taken from outside the vehicle into the vehicle that is provided below the seat rail, the air cleaner being made of a non-metallic material, wherein the communicator is provided below and on an outer side in a vehicle width direction of the seat rail and in a space covered by and on an inner side of a vehicle body cover that protects a vehicle body part, and the communicator is attached to the air cleaner and disposed at the outer side of the seat rail in the vehicle width direction.

2. The vehicle according to claim 1, further comprising:
a control device including the communicator and the processor.

3. The vehicle according to claim 2, further comprising a handlebar lock module that locks turning of the steering shaft, wherein the processor makes a determination to unlock the handlebar lock module.

4. The vehicle according to claim 1, wherein the drive device is the engine, and the vehicle further comprises an exhaust mechanism for exhausting a substance produced in a process of operating the engine to an outside of the vehicle, wherein the communicator is provided on a side, in the vehicle width direction, where the exhaust mechanism is provided.

5. The vehicle according to claim 1, further comprising a battery for operating at least one electrical component provided in the vehicle, wherein the battery is provided on a side opposite to, in the vehicle width direction with respect to a vehicle center as an axis, a side where the communicator is provided.

* * * * *